(12) United States Patent
Tabellini et al.

(10) Patent No.: US 8,485,108 B2
(45) Date of Patent: Jul. 16, 2013

(54) DEVICE FOR CONNECTING THE GANGWAY BELLOWS COVER AND THE CHASSIS OF ARTICULATED VEHICLES

(75) Inventors: Giorgio Tabellini, Sasso Marconi (IT); Luca Guidi, Bologna (IT)

(73) Assignee: P.E.I. Protezioni Elaborazioni Industriali S.r.l. (IT)

( * ) Notice: Subject to any disclaimer, the term of this patent is extended or adjusted under 35 U.S.C. 154(b) by 182 days.

(21) Appl. No.: 12/510,673

(22) Filed: Jul. 28, 2009

(65) Prior Publication Data
US 2010/0025961 A1 Feb. 4, 2010

(30) Foreign Application Priority Data
Jul. 31, 2008 (IT) ................................ BO2008A0489

(51) Int. Cl.
*B62D 63/00* (2006.01)

(52) U.S. Cl.
USPC ................................ 105/20; 403/51; 280/403

(58) Field of Classification Search
USPC ..................... 403/50, 51; 105/18–20; 280/403
See application file for complete search history.

(56) References Cited

U.S. PATENT DOCUMENTS

| | | | | |
|---|---|---|---|---|
| 1,078,758 A | * | 11/1913 | Whitmore | 105/18 |
| 1,095,909 A | * | 5/1914 | Midgley | 105/19 |
| 1,450,007 A | * | 3/1923 | Pflager | 105/18 |
| 2,287,667 A | | 6/1942 | Brown | |
| 2,408,473 A | * | 10/1946 | Nelson | 105/20 |
| 2,893,782 A | * | 7/1959 | Pollock | 296/107.11 |
| 5,259,323 A | * | 11/1993 | Koch et al. | 105/20 |
| 5,884,565 A | | 3/1999 | Koch | |
| 5,953,998 A | * | 9/1999 | Petit | 105/18 |
| 7,568,435 B2 | * | 8/2009 | Mosaner | 105/20 |
| 7,600,772 B2 | * | 10/2009 | Koch et al. | 280/401 |
| 7,971,924 B2 | * | 7/2011 | Tabellini et al. | 296/178 |
| 2010/0025960 A1 | * | 2/2010 | Tabellini et al. | 280/403 |

FOREIGN PATENT DOCUMENTS

| | | |
|---|---|---|
| DE | 102005032218 | 1/2007 |
| EP | 0631890 | 1/1995 |
| EP | 1162121 | 12/2001 |
| FR | 1058014 | 3/1954 |
| FR | 2858287 | 2/2005 |

OTHER PUBLICATIONS

European Search Report dated Nov. 25, 2009 from counterpart European patent application.
European Search Report dated Apr. 23, 2009 from counterpart Italian patent application.
European Search Report dated Oct. 12, 2009 from counterpart European patent application.

* cited by examiner

*Primary Examiner* — Joshua Kennedy
(74) *Attorney, Agent, or Firm* — Timothy J. Klima; Shuttleworth & Ingersoll, PLC

(57) ABSTRACT

A device for connecting the gangway bellows cover and the chassis of articulated vehicles comprises a connecting element (2) having a grip portion (3) which can be stably connected to an end edge (102*a*) of a gangway bellows cover (102) and an engagement portion (4) which can be stably connected to a portion (200) of the vehicle chassis, wherein the grip portion (3) and the engagement portion (4) are rotatably connected to each other in such a way that they rotate relative to each other about a hinge axis (X).

3 Claims, 8 Drawing Sheets

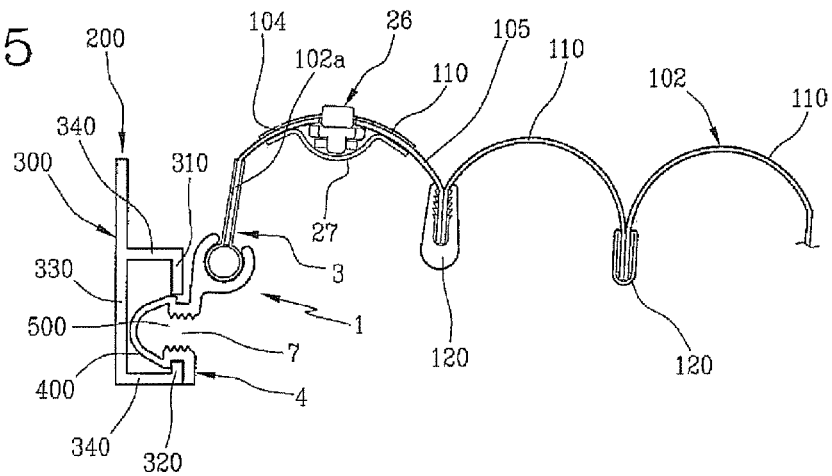
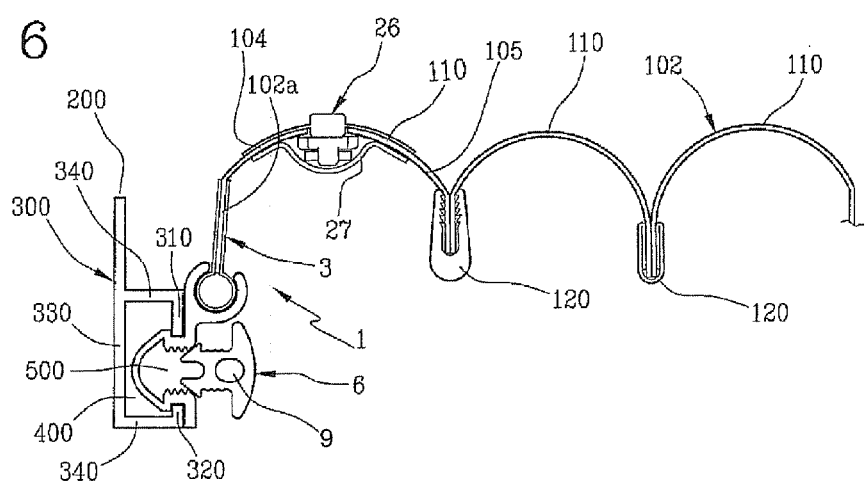
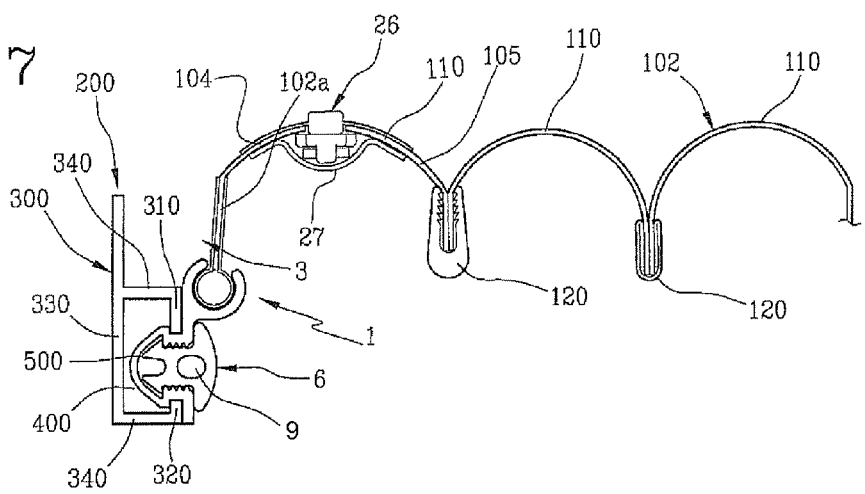

DEVICE FOR CONNECTING THE GANGWAY BELLOWS COVER AND THE CHASSIS OF ARTICULATED VEHICLES

This application claims priority to Italian Patent Application No. BO2008A000489, filed Jul. 31, 2008, which application is incorporated by reference herein.

BACKGROUND OF THE INVENTION

The present invention relates to a device for connecting the gangway bellows cover and the chassis of articulated vehicles, in particular for articulated vehicles such as buses.

In articulated or jointed vehicles, such as city buses, the connection between the two coaches of which the vehicle consists is made by means of rotary platforms able to allow both passenger transit and standing in the connecting zone.

The connection must, necessarily guarantee safety conditions even when the vehicle is cornering, that is to say, even when the two coaches are not aligned with each other.

There are prior art connecting devices consisting of a substantially inverted U-shaped gangway bellows cover whose ends are connected to the free ends of the two coaches, in such a way that the gangway bellows cover covers the rotary platform zone and deforms when the vehicle adopts configurations in which the two coaches are not aligned.

In particular, the gangway bellows cover-style connecting device has an accordion shape, that is to say, it has a plurality of U-shaped bands made of flexible material, usually plasticized fabric, which are joined together longitudinally.

There is also usually an additional inner gangway bellows cover, extending between a lateral wall of the gangway bellows cover and the rotary platform to provide improved protection for the joint between the lateral wall of the gangway bellows cover and the rotary platform.

The outer gangway bellows cover and the additional inner gangway bellows cover are therefore stably fixed to the corresponding ends of the two coaches of the vehicle by means of suitably made connecting systems. These connecting systems comprise a metal section having on one side an edge which can be connected gripper-style to one end of the gangway bellows cover, and on the other side an engagement portion which can be inserted in a corresponding groove in the vehicle chassis. The dimensions of the engagement portion are smaller than the corresponding groove in the vehicle chassis, allowing the insertion, between the engagement portion and the groove, of a rubber fixing seal which holds the section permanently in position and, therefore, renders integral with each other the gangway bellows cover and the chassis of the two coaches belonging to the vehicle.

However, connecting systems of the type described above have significant disadvantages.

First, with the passage of time the seal may lose its elastic properties and therefore allow movements of the section inside the groove in the chassis, and it may even cause detachment of the section with consequent uncoupling of the gangway bellows cover from the chassis.

Moreover, the end of the gangway bellows cover gripped by the gripper action of the above-mentioned edge of the section is subject to substantial deformations at said edge of the section, due to the movements to which the gangway bellows cover is subjected while the vehicle is moving (it should be noticed that the portion of the gangway bellows cover gripped by the section remains stationary whilst the adjacent portion of the gangway bellows cover bends considerably). This causes many breaks in the gangway bellows cover, even after it has been used for a short period of time, with the consequent need for repair or substitution of the gangway bellows cover.

Moreover, the prior art gangway bellows covers suffer from the problem of requiring removal of the seal and the engagement portion if the gangway bellows cover must be removed, for example for cleaning, maintenance or inspection of the vehicle rotary platform. This is very time consuming, involving highly complex operations and the risk of damaging the seal which may necessitate its substitution when the gangway bellows cover is subsequently refitted on the vehicle.

SUMMARY OF THE INVENTION

In this context, the technical purpose which forms the basis of the present invention is to propose a device for connecting the gangway bellows cover and the chassis of articulated vehicles which overcomes the above-mentioned disadvantages of the prior art.

In particular, the present invention has for an aim to provide a device for connecting the gangway bellows cover and the chassis of articulated vehicles which can increase the reliability of the connection between the gangway bellows cover and the chassis.

The present invention has for another aim to propose a device for connecting the gangway bellows cover and the chassis of articulated vehicles which allows an increase in the working life of the gangway bellows cover.

The invention also aims to provide a device for connecting the gangway bellows cover and the chassis of articulated vehicles which can simplify the procedure for removing the gangway bellows cover from the vehicle.

The technical purpose indicated and the aims specified are substantially achieved by a device for connecting the gangway bellows cover and the chassis of articulated vehicles with the technical features described in one or more of the appended claims.

BRIEF DESCRIPTION OF THE DRAWINGS

Further features and advantages of the present invention are more apparent from the non-limiting description which follows of a preferred, non-limiting embodiment of a device for connecting the gangway bellows cover and the chassis of articulated vehicles, illustrated in the accompanying drawings, in which:

FIGS. 3 to 7 are plan views of the joint of FIG. 2 in a sequence of assembly operating steps;

DESCRIPTION OF THE PREFERRED EMBODIMENTS

Figure 1:
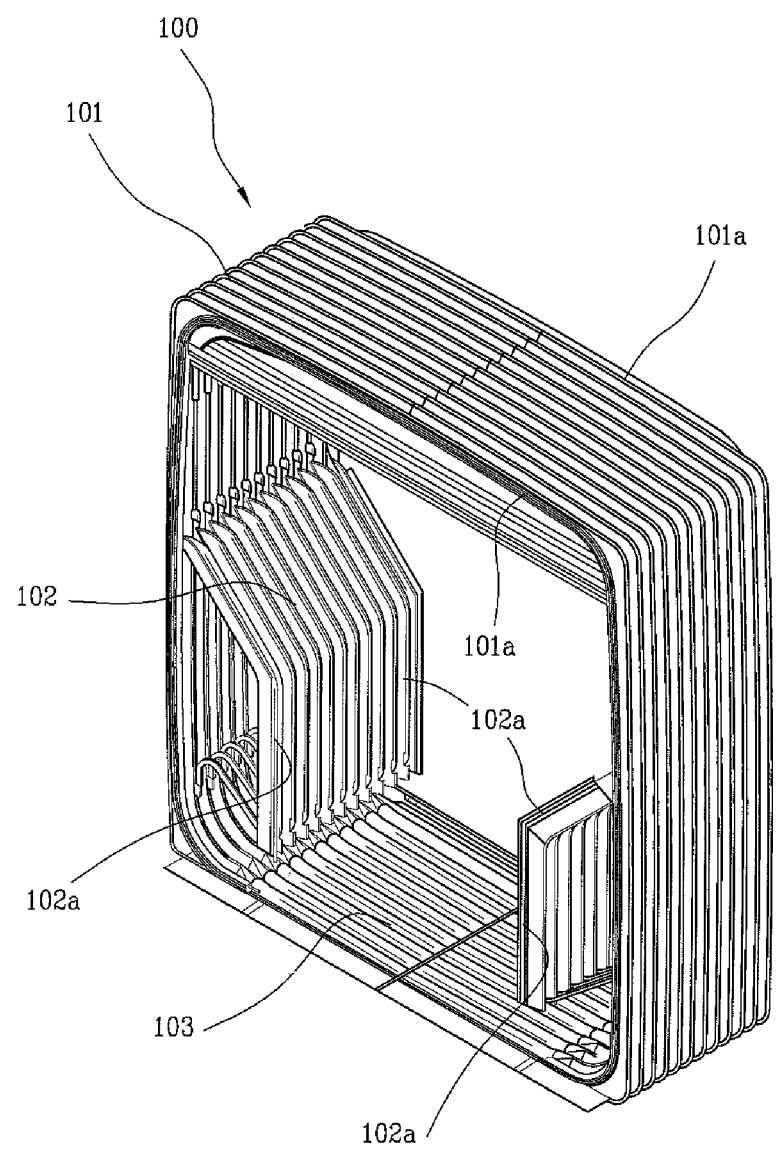
FIG. 1 is a perspective view of a gangway bellows cover for articulated vehicles, and in particular for articulated buses.
Figure 2:
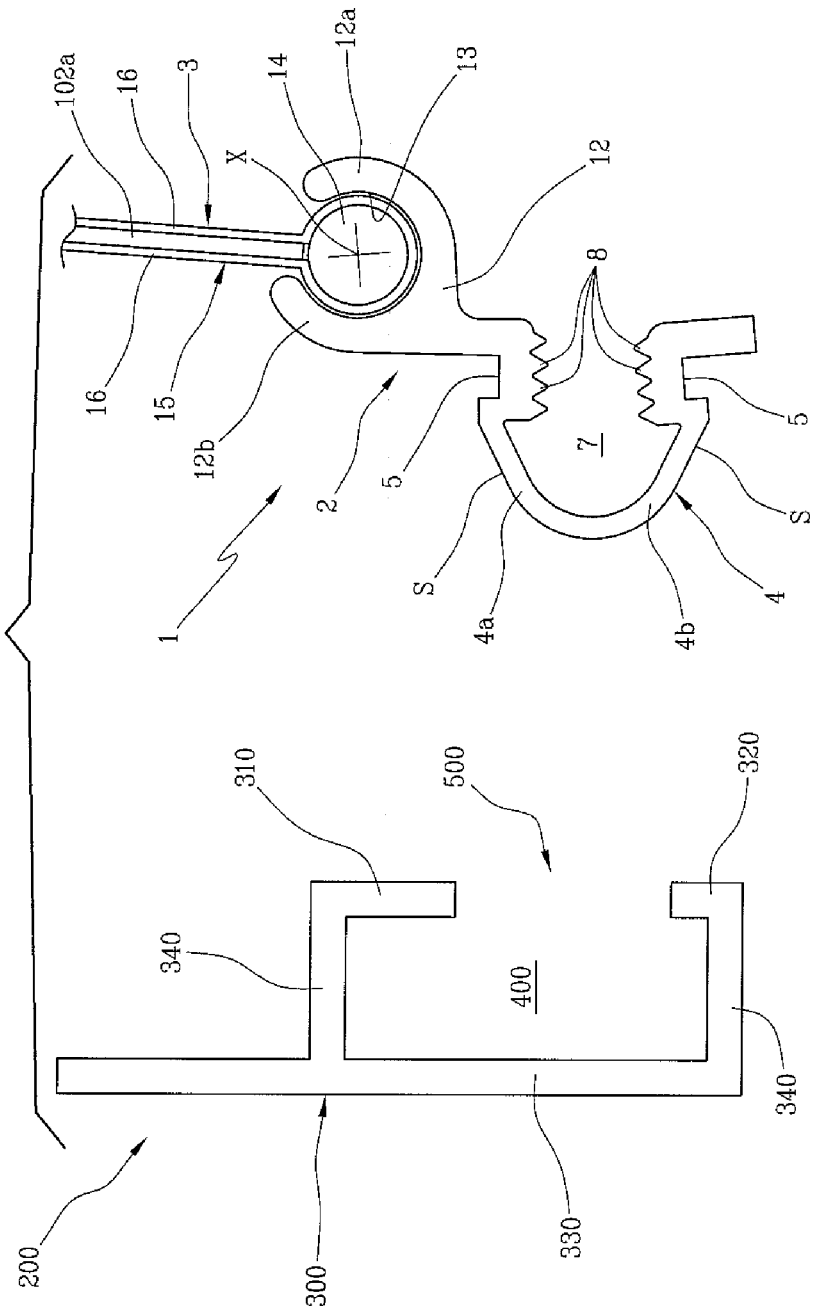
FIG. 2 is a plan view of a chassis—gangway bellows cover joint comprising a connecting device according to the present invention.
Figure 3:
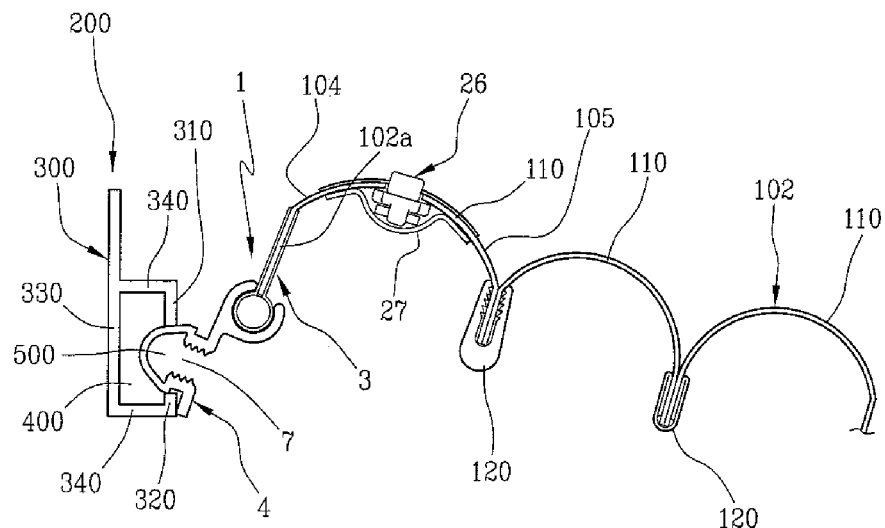
Figure 4:
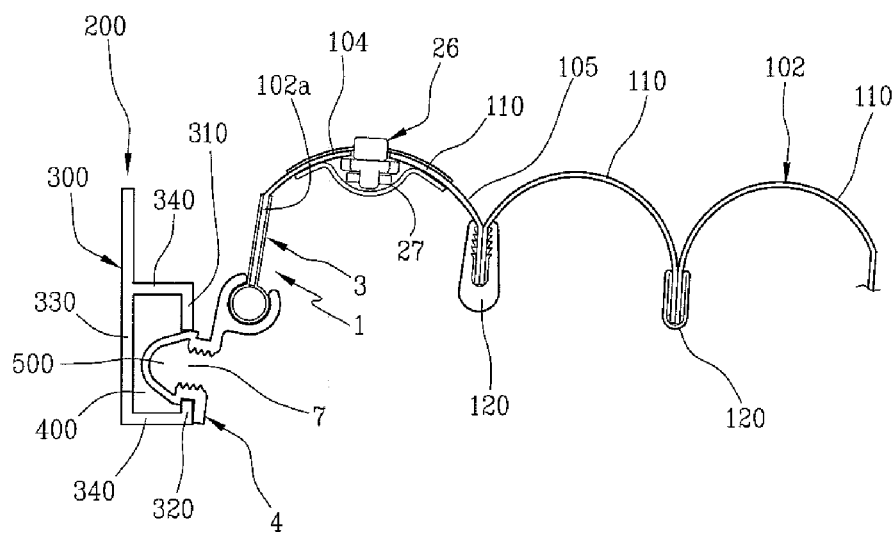

With reference to the accompanying drawings, the numeral 100 denotes as a whole a gangway bellows cover of an articulated vehicle which, preferably but not exclusively, may be an articulated bus. In articulated buses, the gangway bellows cover is in an intermediate position between the two coaches of the bus and in particular is positioned so that it covers the rotary platform which connects the two coaches.

In more detail, the gangway bellows cover 100 comprises an outer gangway bellows cover 101 having an inverted "U" shape and a pair of inner gangway bellows covers 102 located at vertical walls of the outer gangway bellows cover 101 to cover the lower joint zones between the outer gangway bellows cover 101 and a lower masking element 103 which covers the rotary platform.

Each gangway bellows cover 101, 102 comprises a plurality of bands 110 made of flexible material and equipped with stiffening frames 120.

Preferably, the bands 110 are made of plasticized fabric and the stiffening frames 120 are made of aluminum or of rigid plastic material.

The bands 110 are connected to each other to form a single deformable connecting element between the two coaches of the vehicle and, preferably, the bands 110 are sewn together. The deformable connecting element, in the case of the outer gangway bellows cover 101, is "tunnel"-shaped so that it covers the sides and top of the rotary platform join zone.

The stiffening frames 120 have the dual purpose of protecting the stitching between the bands 110 and stiffening the gangway bellows cover structure.

The present invention is preferably applied to the inner gangway bellows covers 102 and specifically to the end edges 102a of the inner gangway bellows covers. However, the invention could be applied to outer gangway bellows covers 101 (and specifically to the end edges 101a of the outer gangway bellows cover).

With reference to FIGS. 2 to 12, the numeral 200 denotes a portion of the chassis of one of the two coaches of the vehicle, and in particular said portion 200 of the chassis may comprise a front end of the chassis or an element applied to the chassis.

According to the accompanying drawings, the above-mentioned portion 200 of the chassis comprises a rigid support 300, preferably a duct, having a main direction of extension and a pair of opposite front walls 310, 320 lying in the same plane, and a rear wall 330 which is parallel with the front walls 310, 320. The front walls 310, 320 and the rear wall 330 are connected by a pair of lateral walls 340 so as to give the duct 300 a prismatic external shape with square or rectangular cross-section.

The duct 300 is hollow inside and has a groove 400 extending in the main direction of extension of the duct 300.

The duct 300 also has a front opening 500 also extending in the main direction of extension of the duct 300 and laterally delimited by the front walls 310, 320. Therefore, the front opening 500 allows frontal access to the groove 400 and the width of the opening is less than a corresponding width of the groove 400, so that from the front opening 500 to the groove 500 there is a widening of the cross-section whose function is explained below.

FIGS. 3 to 7 show a first embodiment of a connecting device 1, according to the present invention, for making the connection between the chassis of the coaches of the articulated vehicle and the gangway bellows cover 100.

The connecting device 1 comprises a connecting element 2 having a grip portion 3 which can be stably connected to the end edge 102a of the inner gangway bellows cover 102, and an engagement portion 4 fixed to the grip portion 3 and which may be inserted in the groove 400. The connecting element 2 has a main direction of extension parallel with the main direction of extension of the groove 400.

The engagement portion 4 is wedge-shaped and, more precisely, it is mushroom-shaped) to facilitate its insertion in the groove 400, and it has a first portion and a second portion, respectively labeled 4a and 4b, opposite each other and designed to make contact with the front walls 310, 320 of the duct 300. Each of the two portions 4a, 4b has a recess 5 designed to stably hook to one of the front walls 310, 320 of the duct 300 to form a permanent connection, by means of undercuts, of the engagement portion 4 in the groove 400. In more detail, the engagement portion 4 can deform between a first position illustrated in FIGS. 4 and 5, in which the two portions 4a, 4b are close to each other to allow insertion in the front opening 500, and a second position, illustrated in FIGS. 6 and 7 in which the two portions 4a, 4b are distant from each other to stably engage with the respective front walls 310, 320 of the duct 300.

The engagement portion 4 is preferably made of metal and more preferably of aluminum. Moreover, the entire connecting element 2 is preferably made using a metal section, in particular made of aluminum.

Even more preferably, the engagement portion 4 is elastically deformable between the above-mentioned two positions, thus allowing a snap-on connection with the front walls 310, 320 of the duct 300, which form projections acting as retaining elements for stably holding the engagement portion 4 in the groove 400. In that condition, being wedge-shaped, the engagement portion 4 can easily be inserted by pushing into the front opening 500 of the duct 300 and during said step the engagement portion elastically deforms until it locks snap-on-style (thanks to its elastic return) on the front walls 310, 320 once it has been completely inserted (FIG. 6). The two portions 4a, 4b of the engagement portion 4 form respective guide surfaces "S" designed to make contact with the front walls 310, 320 and to slide relative to the latter, promoting insertion of the engagement portion 4 in the front opening 500 of the duct 300. The guide surfaces "S" converge towards a front portion of the engagement portion 4 in such a way that the gradual insertion of the engagement portion 4 in the front opening 500 causes the two portions 4a, 4b of the engagement portion 4 to gradually move towards each other. The engagement portion 4 is preferably obtained using a thin section which follows the outer profile of the engagement portion 4, which therefore remains hollow, forming the cavity 7 between the two portions 4a, 4b. The thin section has a thickness adapt to confer an elastic deformability to the engagement portion and, in particular, to allow a mutual approaching and spreading movement between the two portions 4a, 4b of the engaging portion 4.

Advantageously, the connecting device 1 comprises fixing means acting on the two portions 4a, 4b of the engagement portion 4 to stably hold them distant from each other, in particular when the engagement portion 4 is inserted in the groove 400.

The fixing means preferably comprise a removable insert, which can be inserted in the cavity 7 by forcing it with pressure or by screwing between the two portions 4a, 4b for keeping the two portions 4a, 4b pushed away one from the other and therefore wedged within the groove 400. The removal of the insert allows a re-approaching of the portions 4a, 4b and therefore the extraction of the engagement portion 4 from the groove 400.

As shown in FIGS. 3 to 7, the fixing means comprise an elastic seal 6 which can be inserted by pressing it into a cavity 7 made in the engagement portion 4 between the above-mentioned two portions 4a, 4b. The cavity 7, whose main direction of extension is parallel with the main direction of extension of the groove 400 and of the engagement portion 4, is designed to lie along the front opening 500 when the engagement portion 4 is inserted in the groove 400 (FIGS. 6 and 7).

Moreover, preferably, the two portions 4a, 4b of the engagement portion 4 have a plurality of inner protuberances or threads 8 which can engage by making contact with the seal 6 and which are designed to improve adherence between the engagement portion 4 and the seal 6.

Preferably, the seal 6 is also wedge-shaped, for stable insertion in the cavity 7.

Preferably, the seal 6 also has at least one inner hollow 9 designed to promote seal 6 deformation by crushing during its insertion in the cavity 7.

Figure 8:
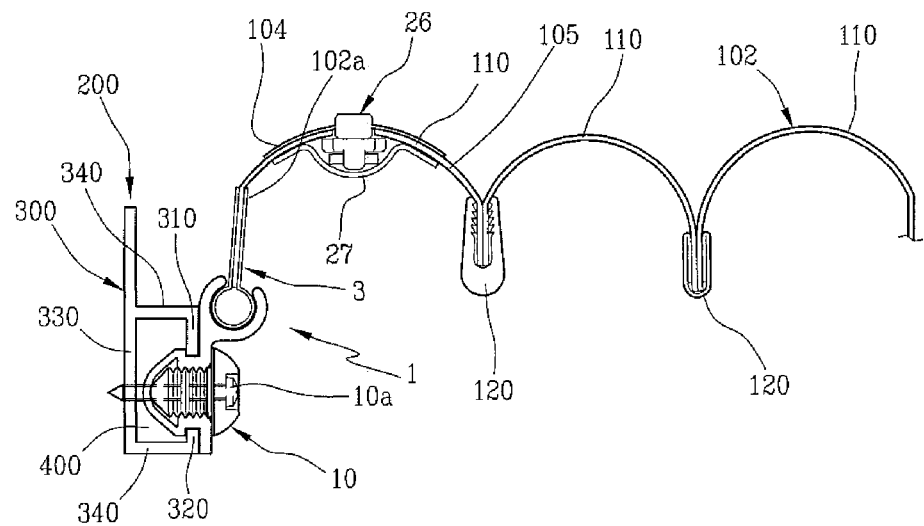
FIGS. 8 and 9 illustrate two alternative embodiments of the joint of FIGS. 3 to 7.

FIG. 8 shows an alternative embodiment in which the fixing means comprise a plurality of spacer elements 10 (only one of which is visible in FIG. 8) inserted using pressure in the cavity 7 at a predetermined distance from each other.

Figure 9:
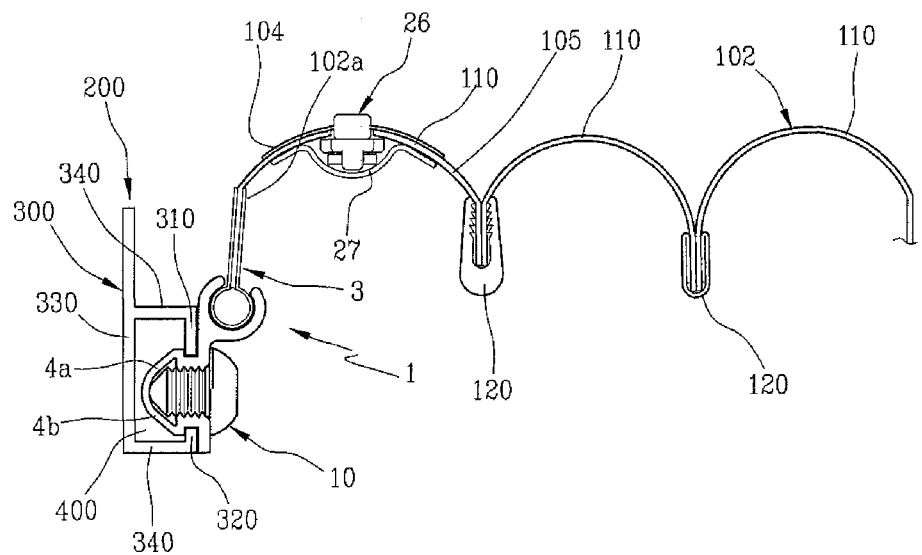

According to another alternative embodiment, illustrated in FIG. 9, and constituting an improvement on the alternative embodiment illustrated in FIG. 8, each spacer element 10 has a through-hole for the insertion of a threaded element 10a which completely passes through the spacer element and also passes through a through-hole made in the front portion of the engagement portion until it screws into a hole made in the rear wall 330 of the duct 300. The threaded element 10a therefore permanently locks the spacer element 10, and therefore the engagement portion 4, relative to the duct 300.

Figure 10:
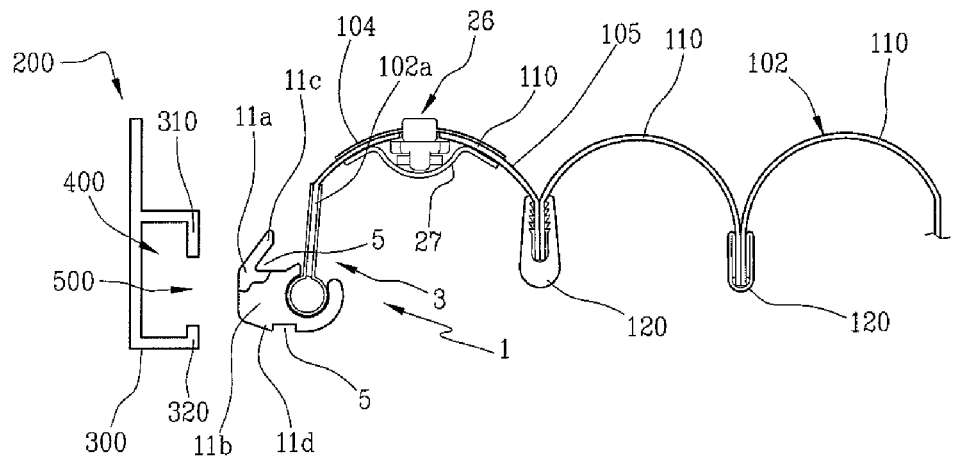
FIGS. 10 to 12 illustrate another alternative embodiment of the joint of FIGS. 3 to 7 in a sequence of assembly operating steps.
Figure 11:
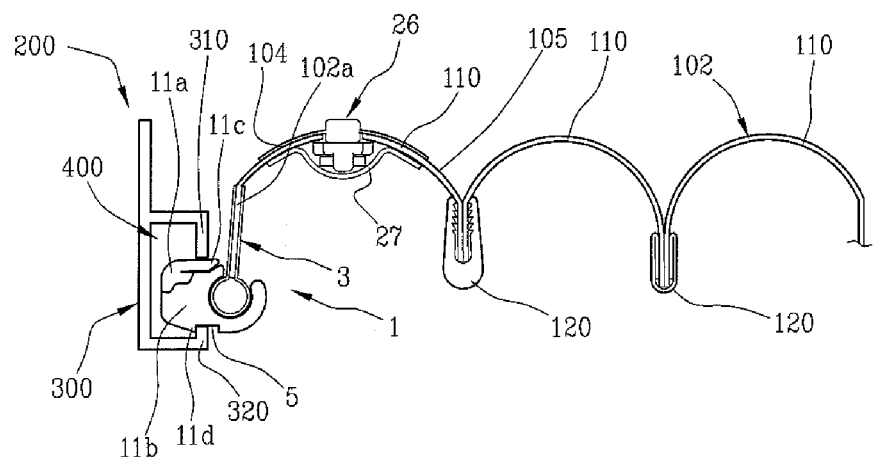
Figure 12:
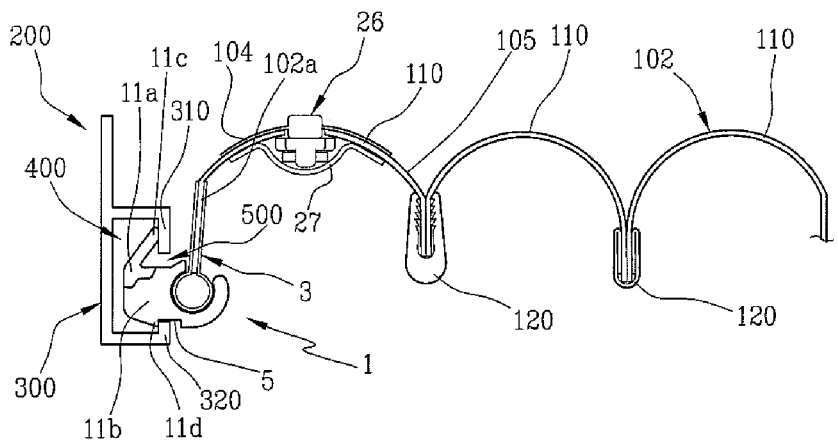

FIGS. 10 to 12 show an alternative embodiment of the connecting device 1 in which the engagement portion 4 comprises a first block 11a made of a first material, and a second block 11b fixed to the first block 11a and made of a second material. The two materials preferably have different deformability properties.

Each of the two blocks 11a, 11b has a respective portion 11c, 11d forming the recess 5. Moreover, as described above, the engagement portion 4 is elastically deformable between a first position (FIG. 10), in which the portion 11c of one block 11a is close to the other block 11b to promote insertion of the engagement portion 4 in the groove 400 (FIG. 11), and a second position (FIG. 12), in which the portion 11c of the block 11a is distant from the other block 11b, allowing the portion 11c to hook inside the groove 400, forming a stable connection of the engagement portion 4 in the groove 400.

Preferably, only one of the two blocks 11a is deformable to the extent that it allows deformation of the respective portion 11c. In contrast, the other block 11b is substantially non-deformable.

According to an alternative embodiment, both blocks are deformable to the extent that they allow deformation of the respective portion 11c, 11d.

Figure 13:
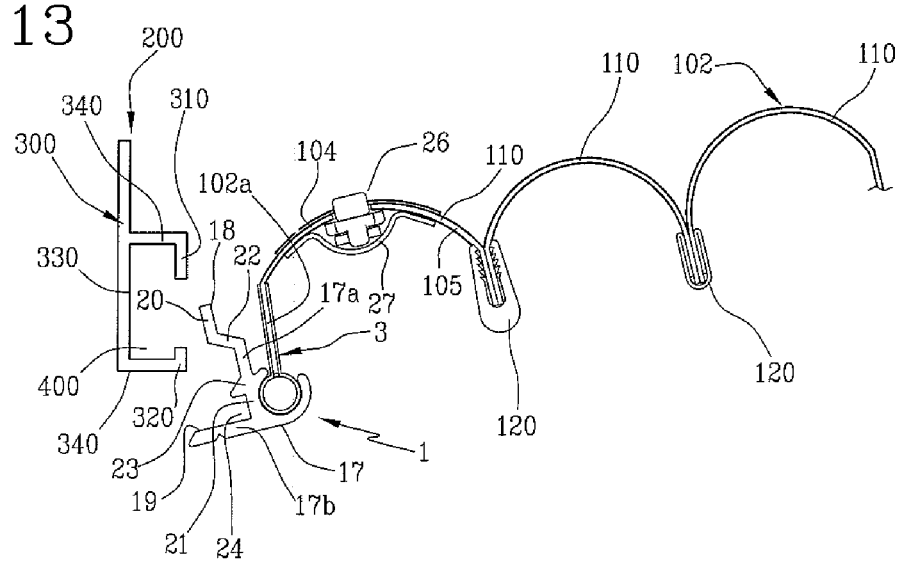
FIGS. 13 to 15 illustrate another alternative embodiment of the joint of FIGS. 3 to 7 in a sequence of assembly operating steps.
Figure 14:
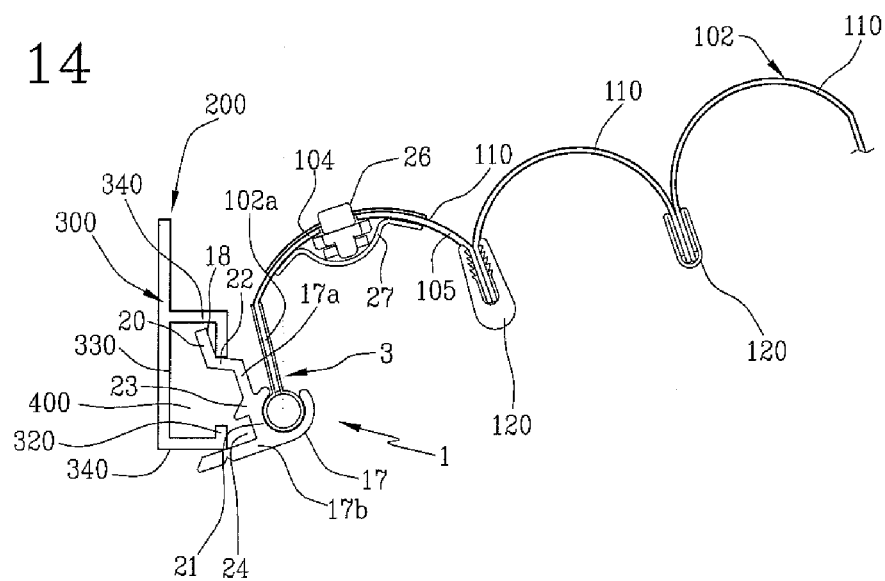
Figure 15:
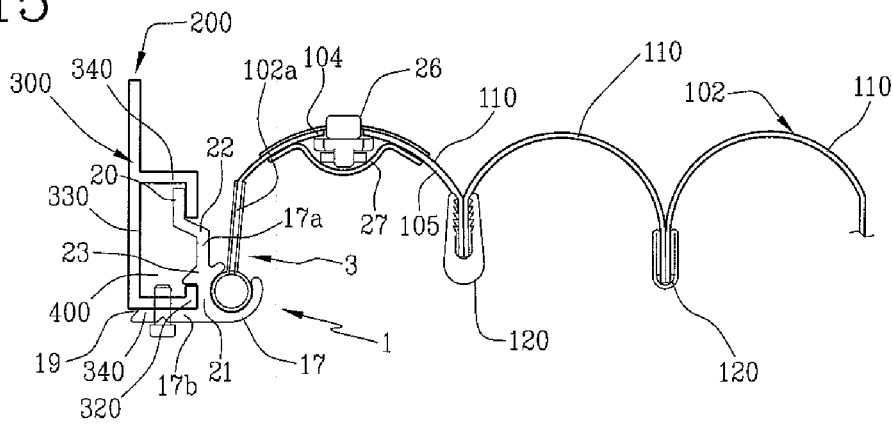

FIGS. 13 to 15 show another alternative embodiment of the connecting device 1, in which the engagement portion 4 comprises a rigid element, that is to say, an element which is substantially non-deformable, preferably a section 17, which can be inserted in the groove 400 and which has a first engagement surface 18 that can be abutted to an inner surface 410 of the groove 400, and at least a second engagement surface 19 which can be abutted to an outer surface 420 of the duct 300.

The two engagement surfaces 18, 19 are shaped to match the corresponding inner and outer surfaces 410, 420 to which they are abutted, and are preferably flat.

In more detail, the inner surface 410 of the groove 400 is formed by one of the front walls 310, 320 of the duct 300. In contrast, the outer surface 420 of the groove 400 is formed by one of the lateral walls 340 of the duct 300, and in particular by the lateral wall 340 opposite the wall 310 which forms the inner surface 410. In that way, the two surfaces, one inner 410 and one outer 420, are perpendicular to each other and give the section 17 an "L" shape.

The section 17 in turn has a first portion 17a and a second portion 17b at a right angle to each other. The first portion 17a forms the first engagement surface 18 and the second portion 17b forms the second engagement surface 19.

Advantageously, the first portion 17a of the section 17 has a first, outermost stretch 20, which can be abutted inside the groove 400 and which comprises the first engagement surface 18, and a second stretch 21, between the first stretch 20 and the second portion 17b of the section 17, which can be abutted outside the groove 400 (and therefore outside the duct 300). The two stretches 20, 21 each rest on a different front wall 310, 320 of the duct 300 by means of respective flat walls which lie in parallel offset planes. The two stretches 20, 21 are connected by means of an angled connector 22.

Moreover, preferably, the first portion 17a also has a protrusion 23 extending away from the second stretch 21 and delimiting, in conjunction with the second stretch 21 and with the second portion 17b of the section 17, a housing 24 for the front wall 310 of the duct 300.

In that way, the section 17 may be inserted with a first movement setting it at an angle relative to the duct 300 (FIG. 13), then a translation of the section 17 with insertion of the first portion 17a in the groove 400 through the front opening 500 (FIG. 14) and a subsequent straightening of the section 17 with insertion of the front wall 310 in the housing 24 and contact between the second engagement surface 19 and the lateral wall 340.

This allows the section 17 to remain inserted by means of an undercut in the duct 300.

Preferably, the section 17 is fixed to the duct 300 using one or more locking screws 25, preferably applied between the second portion 17b of the section 17 and the lateral wall 340 of the duct 300 on which it is applied.

According to an inventive aspect of the present invention, the connecting device 1 also comprises joining means 26, applied to the inner gangway bellows cover 102 at least at one of the bands 110, preferably the band 110 closest to the vehicle chassis (that is to say, the band 110 closest to the join with the vehicle).

The joining means 26 are preferably located in a central portion of the band 110, that is to say, in a middle section of the band 110.

Moreover, a covering element 27 is preferably applied, to cover the joining means 26 and hide the joining means 26 from view. In particular, the covering element comprises a strip of rigid or deformable material, having opposite outer flaps 27a, 27b which can be stably applied to portions of the gangway bellows cover 102 located on opposite sides of the joining means 26.

Since the bands 110 are curved and have the concavity facing towards the gangway tunnel between the vehicle coaches, the covering element 27 is preferably applied to the concave side of the band 110.

The covering element 27 preferably has a central portion 27c, between the flaps 27a, 27b, which is raised relative to the flaps so that it can be adapted to the dimensions of the joining means 26 that it covers.

In other words, the inner gangway bellows cover 102 is divided into two parts 104, 105 and the joining means 26 are positioned at the joining line between the two parts 104, 105 of the inner gangway bellows cover 102 to create a reversible stable connection between the two portions 104, 105. In that way, the part 104 between the connecting element 2 and the joining means 26 remains stably connected to the vehicle chassis even when the joining means 26 are released to allow removal of the other part 105 of the gangway bellows cover 102 and subsequent simple and practical refitting. Therefore, the part 104 of the gangway bellows cover 102 is preferably kept to a minimum so as to maximize the portion 105 of gangway bellows cover which can be removed, for example for vehicle cleaning, maintenance and inspection.

Figure 16:
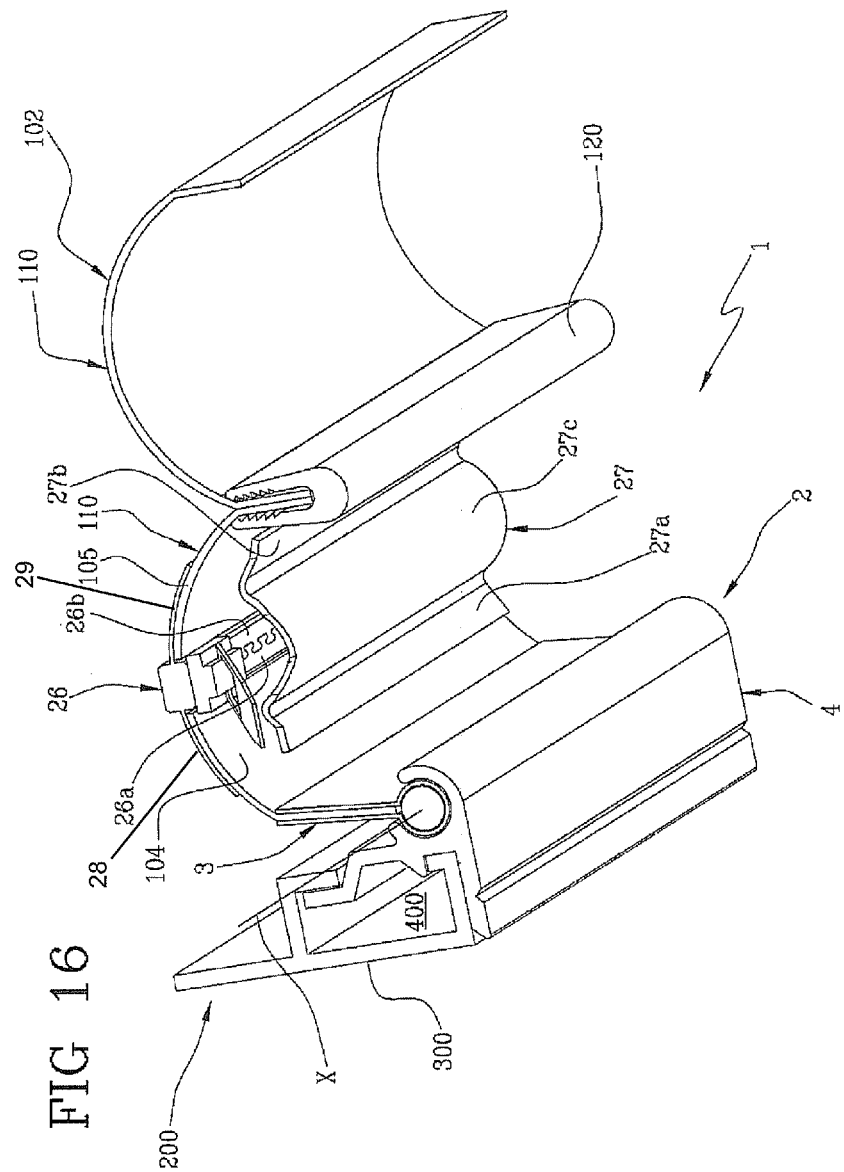
FIG. 16 is a perspective view of the joint of FIGS. 13 to 15.

In the embodiment illustrated, the joining means 26 comprise a zip fastener. As FIG. 16 shows more clearly, the zip fastener has a first flap 28 stably connected to an end flap of the first part 104 of the gangway bellows cover 102 and a second flap 29 stably connected to an end flap of the second part 105 of the gangway bellows cover 102.

To allow access to the zip fastener, or more generally to the joining means 26, the covering element 27 is removably applied to the gangway bellows cover 102 at least at one of its flaps 27a, 27b, and preferably at both.

Said removable connection is for example achieved using snap-on couplings, Velcro® or other removable connecting means.

The joining means 26 can be applied to the inner gangway bellows cover 102 (and if necessary also to the outer gangway bellows cover 101) in all of the embodiments of the connecting device 1 described and illustrated.

The grip portion 3 is connected to the engagement portion 4 by means of a hinge for pivoting about a hinge axis "X" with respect to the engagement portion 4. Preferably, the hinge allows the grip portion 3 to rotate freely with respect to the engagement portion 4 in such a way to compensate any misalignment of the gangway bellows cover during motion of the vehicle.

In detail, the engagement portion 4 has a receiving portion 12 forming a cylindrical cavity 13 with circular cross-section extending about the axis "X", whilst the grip portion 3 has a cylindrical element 14 rotatably inserted in the cylindrical cavity 13 so that it can rotate about the hinge axis "X".

The hinge axis "X" is preferably parallel with the main direction of extension of the connecting element 2.

In other words, the connecting element 2 has a receiving portion 12 fixed to the engaging portion 4 and connected to the grip portion 3 in a pivotable manner about the hinge axis "X". More in detail, the receiving portion 12 is fixed to one of the two portions 4a, 4b of the engagement portion 4, the other portion 4b defining an end portion of the engagement portion 4.

Moreover, the receiving portion 12 extends away from the portion 4a of the engagement portion 4, preferably in a direction parallel to the direction of mutual approaching and spreading movement between the two portions 4a, 4b of the engaging portion 4 for allowing a free and easy access to the cavity 7 for inserting the fixing means.

The grip portion 3 also comprises a supporting element 15 rigidly connected to the cylindrical element 14 so that it can rotate with the latter about the axis "X". The supporting element 15 has a pair of parallel plates 16 between them forming a housing for the end edge 102a of the inner gangway bellows cover 102. The end edge 102a of the inner gangway bellows cover 102 is held in the housing by gluing, or by means of fixing screws or other anchoring systems.

The receiving portion 12 has two opposite retaining portions 12a, 12b which are distant from each other to allow the passage of the parallel plates 16 and also to allow the supporting element 15 to rotate through a predetermined angle. In other words, the two retaining portions 12a, 12b of the receiving portion 12 form a supporting surface for supporting the supporting element 15 and the cylindrical element 14, having a gap zone where the two parallel plates 16 of the supporting element 15 are positioned.

The grip portion 3 described is used in all of the embodiments in accordance with the present invention.

The present invention achieves the preset aims, overcoming the disadvantages of the prior art.

The shape of the connecting element, and in particular the shape of the engagement portion, allows two stable anchoring points to be made available (provided by the two portions of the engagement portion) which can be further stabilized using the fixing means. Also, where the engagement portion is made of metal, there is a very stable connection which resists wear and fatigue.

Where the engagement portion is made using two blocks made of different materials, there is a significant simplification of assembly of the engagement portion, which can be applied in a single insertion step in the groove without having to prepare additional fixing elements.

In contrast, where the engagement portion consists of the rigid "L"-shaped section, application of the connecting element to the duct is very rapid and does not involve deformability of any element, providing a very reliable connection. Subsequent fixing, using screws for example, noticeably increases the stability of the connection.

Moreover, the hinged structure of the connecting element allows the end edge of the inner gangway bellows cover to rotate relative to the vehicle chassis. This allows significant absorption of the bending movements to which the gangway bellows cover is subjected while the vehicle is moving, consequently reducing the bending stresses at the portion of the gangway bellows cover connected to the chassis. As a result, the gangway bellows cover lasts for longer without rips and/or tears which would otherwise require it to be substituted.

Moreover, use of the zip fastener significantly simplifies maintenance, inspection or cleaning operations for the vehicle rotary platform and therefore the gangway between the vehicle coaches, since the connecting element no longer has to be removed from the duct. Instead, the zip fastener can simply be used, being applied on the gangway bellows cover in a position which allows the removal of almost all of the gangway bellows cover.

What is claimed is:

1. A gangway bellows cover style joint for an articulated vehicle, comprising:
 a gangway bellows cover comprising a sequence of curved bands made of flexible material and connected to each other to form a single deformable body;
 at least one connecting device for connecting a portion of a vehicle chassis and an end edge of the gangway bellows cover, the at least one connecting device being fixed on one side to the portion of the vehicle chassis, and on another side being fixed to an end edge of the gangway bellows cover;
 a reversible joining mechanism applied to the gangway bellows cover in a central portion of one of the bands closest to the portion of the vehicle chassis, the reversible joining mechanism allowing the removal of at least one part of the gangway bellows cover from the connecting element and subsequent refitting of the at least one part of the gangway bellows cover to the connecting element;
 at least one covering element positioned to cover the joining mechanism and operating in conjunction with the gangway bellows cover to hide the joining mechanism from view;

wherein the covering element includes a reversible fixing mechanism, allowing the covering element to be removably applied to the gangway bellows cover; and wherein the covering element is removably applied at a concave side of the one of the bands closest to the portion of the vehicle chassis.

2. The device according to claim 1, wherein the covering element is positioned so that it covers the joining mechanism and is applied to two different portions of the gangway bellows cover which are located on opposite sides of the joining mechanism.

3. The device according to claim 2, wherein the joining mechanism is located in a central portion of the one of the bands closest to the portion of the vehicle chassis.

* * * * *